Figure 1:
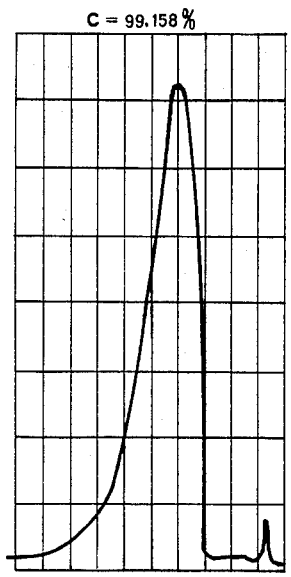

United States Patent [19]

Padoan

[11] Patent Number: 4,497,754
[45] Date of Patent: Feb. 5, 1985

[54] CASTING PLASTIC LENSES FROM THERMOHARDENING MONOMER WITH COMPENSATION FOR POLYMER EXPANSION AND SHRINKAGE

[75] Inventor: Giorgio M. Padoan, Milan, Italy

[73] Assignee: Societa' Italiana Lenti S.I.L.-S.r.l., Pordenone, Italy

[21] Appl. No.: 240,825

[22] Filed: Mar. 5, 1981

Related U.S. Application Data

[63] Continuation of Ser. No. 61,882, Jul. 30, 1979, abandoned.

[51] Int. Cl.³ .............................................. B29D 11/00
[52] U.S. Cl. ..................................... 264/1.4; 264/2.2; 264/2.3; 425/808
[58] Field of Search ................. 425/808; 264/1.4, 2.2, 264/2.3

[56] References Cited

U.S. PATENT DOCUMENTS

| 2,342,378 | 2/1944 | Smith | 264/2.4 |
| 2,542,386 | 2/1951 | Beattie | 425/808 |
| 3,240,854 | 3/1966 | Ewer | 264/2.2 |
| 3,738,775 | 2/1976 | Sarofien | 425/808 |
| 4,113,224 | 9/1978 | Clark et al. | 264/2.2 |

FOREIGN PATENT DOCUMENTS 847797  9/1960  United Kingdom ................ 264/2.2

Primary Examiner—James Lowe
Attorney, Agent, or Firm—Kimmel, Crowell & Weaver

[57] ABSTRACT

Plastic lenses are cast from thermohardening resins using two mating mold halves positioned in a tubular sleeve which is provided with a fluid compensating reservoir that retains excess resin. As the mold is heated to polymerize the resin the monomer first expands in volume and flows into the reservoir, then as the polymerizing resin contracts additional resin flows out of the reservoir into the mold until the gel stage is reached. Polymerization is completed by moving the mold halves towards each other.

13 Claims, 21 Drawing Figures

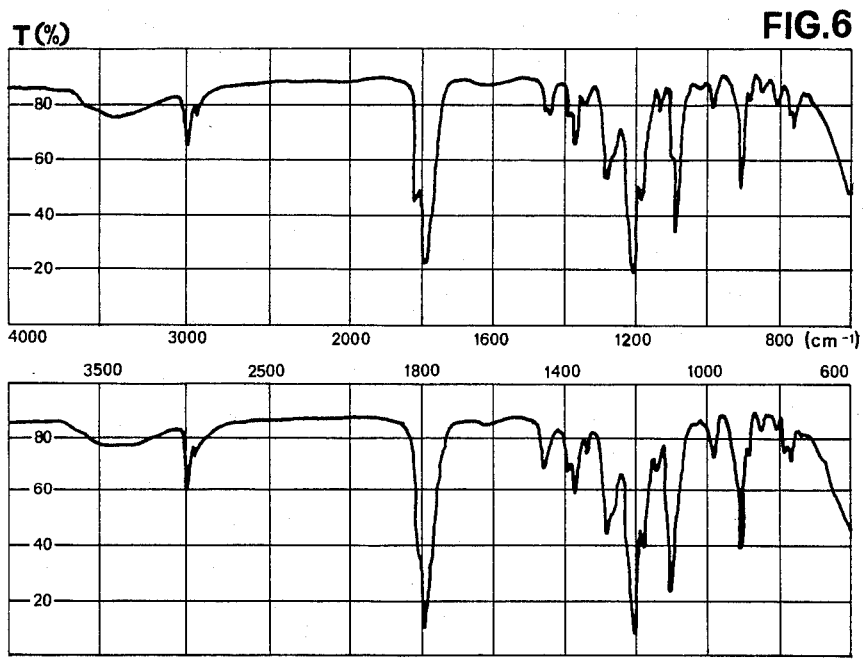
FIG.6
FIG.7
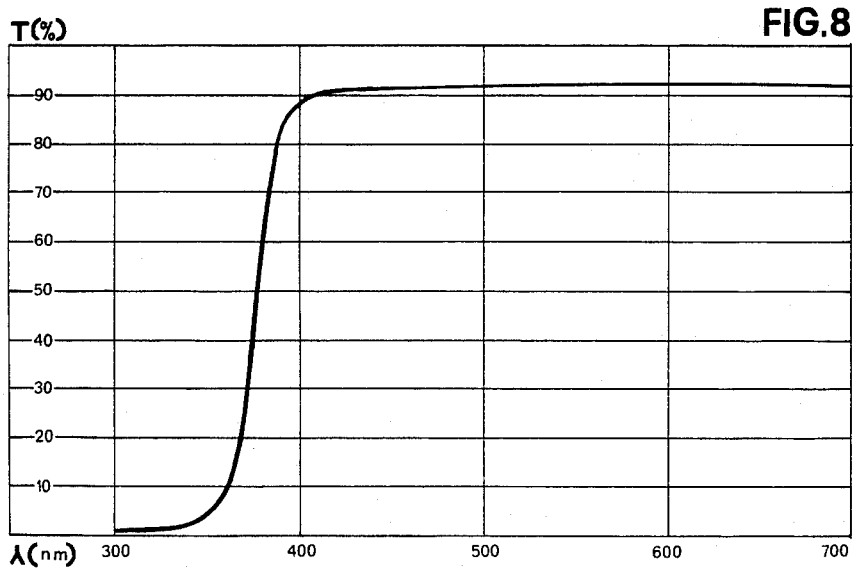
FIG.8

U.S. Patent  Feb. 5, 1985  Sheet 4 of 4  4,497,754

CASTING PLASTIC LENSES FROM THERMOHARDENING MONOMER WITH COMPENSATION FOR POLYMER EXPANSION AND SHRINKAGE

The present invention relates to the production of lenses and optical devices made of polymerizable synthetic resins, through a continuous compensation casting process.

In the last several decades, the technological world has paid close attention to the research in molding methods and techniques based on the mold polymerization of one or more monomers, which are capable of producing solids having special characteristics.

The optical industry has been engaged in such research to produce lenses or other optical means. In practice, the various technologies have attempted to overcome the obstacles occurring during the polymerization process, such as:

physico-chemical characteristics of the product, correlated to the theoretically optimal polymer;
physico-chemical characteristics of the product, correlated to the polymer obtained;
shape of the product.

These technologies have been directed, in particular, towards the casting of thermohardening polymers, as the latter offer physico-chemical characteristics and other advantages which are better suited, when used as optical devices, e.g., lenses, than the thermoplastic polymers. In this regard, the compound, diethyleneglycol-bis-allyl-carbonate (and its copolymers) having the formula:

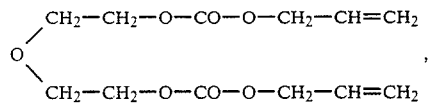

is now in general use, being better known in the art by its trade name CR-39. The latter, with the addition of a catalyzer (or more particularly, a free-radical initiator starter), polymerizes to an homopolymer or to a copolymer.

The preferred initiator is the isopropyl-dicarbonate-peroxide having the formula:

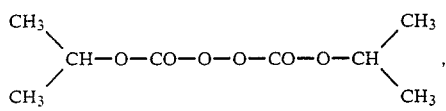

this material being known in the art as I.P.P. The latter allows the polymerization to run at a lower temperature and within shorter cycles, as compared to benzoyl-peroxide or to other peroxides, which also may be used. In practice, the casting methods for a lens made of CR-39, or its copolymers, includes the introduction of catalyzed monomer(s), in the fluid state, or prepolymerized up to the syrupy state, between two glass lenses, kept together by means of a spring, and kept at a given distance from each other, through a T-shaped gasket. The gasket spacer may be shaped according to the curvature of both lenses, to secure tightness and separation, or to the same end it may become elastically deformed. The catalyzed monomer, added as a fluid in the mold thus formed, solidifies at the end of a thermic or radiating cycle, producing strong tridimensional shrinking (14% in the case of the CR-39 homopolymer). Thus a further function of the spring is to continuously squeeze the spacer of the lenses forming the mold, until the fluid reaches the intermediate gel state, to avoid the leakage of fluid monomer from the mold. On the other hand, after the gel phase has been reached, the pressure of the spring strains the thermoplastic or elastic spacer, to facilitate the adherence of the mold to the polymer. Such a strain may be considered as a squeezing of the spacer or as an expansion of the gasket.

The mold/polymer adherence is required to avoid possible breakages of the polymer or of the mold, due to the strong tensions which occur when the polymer shrinks, and to avoid, at least on the functional surface of the polymer, air infiltrations which, by hindering the polymerization, would cause irreparable damages to the product.

The lenses thus obtained, made of CR-39, or its copolymers, may present faulty perimeters, due to air bubbles. Air leakages, even after the gel phase is ended, may cause air bubbles and cavities, or the formation of a perimetrical soft polymer stripe, or a possible chemical reactivity between the gasket material and the catalyzed monomer. A feature common to all processes is an appreciable reduction of the diameter of a lens made of CR-39 and its copolymers, with respect to the diameter of the lenses forming the mold. This is due to the following reasons:

(A) the internal mold cavity is reduced by the space occupied by the sealing gasket, acting as a distancer or spacer.

(B) the tridimensional shrinkage of the polymer involves also the perimetrical stripe, thus further reducing the diameter of the product, particularly in the case of negative or diverging lenses.

(C) possible perimetrical faults (air bubbles, air suctions and a stripe of soft polymer) equally reduce the usable diameter by the affected depth.

These faults generally occur in the perimetrical stripe, as by now it is generally preferred to position the molds with their concave side upwards. Whereas the positioning of the molds with their convex side upwards, would originate the same faults at the center of the polymeric lenses, thus reducing the lenses worthless. Concavity and convexity are referred to the external side of the molds.

After the sealing gasket has been removed, the opening of the mold is carried out by introducing a wedge into the slot previously occupied by the distancer, and using it as a lever between the two glass lenses, which normally adhere to the polymer. The polymeric lens thus extracted is complete, so far as the surfaces are concerned, but sharply tensioned due to the shrinkage. To achieve its structural distension, the lens has then to be submitted to a thermal treatment. This treatment, or temper distension, is currently applied to all mold plastic materials, to glass, and to metals. The duration of the treatment, to obtain the desired effect, depends upon the temperature, related to the state of tension existing in the product and to the grade of polymerization of the polymer.

The above disclosure is intended to provide preliminary information on the prior art related to the polymerization process. It comprises a summary of experimental researches, carried out by the inventor, and of documentation derived from patents. Such patents include the following: U.S. Pat. Nos. 2,403,112; 2,464,062;

3,171,869; 3,038,210 and 2,964,501; French Pat. Nos. 2,171,073; 1,541,889; 1,204,627; 1,462,519; German Pat. No. 1,062,003 and British Pat. No. 1,042,573.

The present invention takes into consideration the numerous disadvantages of a technical and/or of an economical nature, which occur in the production of lenses or optical means made of CR-39 and its copolymers. The process of the present invention studies, plans and solves the problem of producing lenses or optical means made of CR-39 and its copolymers, in a completely new manner, with reference to:

the chemical basic preparation of the components;
the ways and the means of polymerization;
the shape of the articles, obtainable without any reduction;
the possible unification of the polymerization cycles, for all given thicknesses;
obtaining a polymer having special adsorption and transmission requirements of electromagnetic energy.

MONOMER: The diethyleneglycol-bis-allyl-carbonate, or CR-39, is to be found on the market at a high purity grade, i.e., about 99.150%. Gas chromatographic analysis indicates the presence of the allyl-carbonate and of a not well identified substance. (FIG. 1).

During the column separation performed on occasion of the a.m. analysis, it was stated that the impurities are more volatile, i.e., have shorter retention times than the monomer. An experimental series was then carried out to eliminate the impurities and the following were discovered:

the allyl carbonate is eliminated when the monomer is submitted to a warming up at a temperature of 50°–90° C.;

this elimination is possibly due to a partial polymerization of the allyl carbonate as it may be analytically stated by observing the area referring to the above mentioned unidentified product;

the latter may, as a consequence, be considered as a polymer of the allyl carbonate.

The above was confirmed during the warming up of the monomer, carried out on purpose on a longer time span, at a temperature of 90° C., in static tanks. As the elimination of the allyl carbonate was partially suppressed, due to the tanks staticity, the analysis of the monomer revealed an appreciable increase of the polymer, caused by the allyl carbonate. These facts having been ascertained, a depurating system of the monomer was set up, as indicated in following example:

EXAMPLE NO. 1

The monomer CR-39 was gradually warmed up, at temperatures in the range of 50°–90° C.

The partial elimination of the allyl carbonate obtained at all the a.m. temperatures was obviously related to the ratios: time—temperature—quantity treated.

Figure 2:
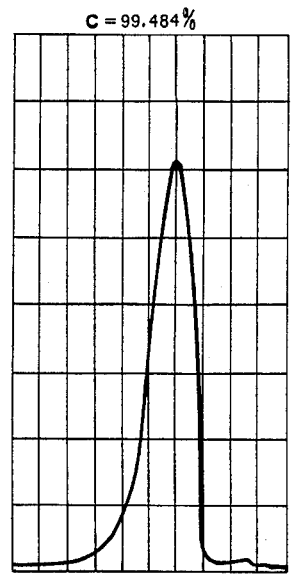

In practice at a lower temperature, a longer duration of the operation was required; whereas a higher temperature corresponded a shorter duration of the treatment. Thus for instance:

Quantity of the treated monomer CR-39: 1 Liter;
Average thermic value: 70° C. during four hours+the warming up time and the time of the gradual cooling down to room temperature.
Strength of the monomer, before treatment: 99,158 (FIG. 1).
Strength of the monomer, after treatment: 99,484 (FIG. 2).

EXAMPLE NO. 2

Figure 3:
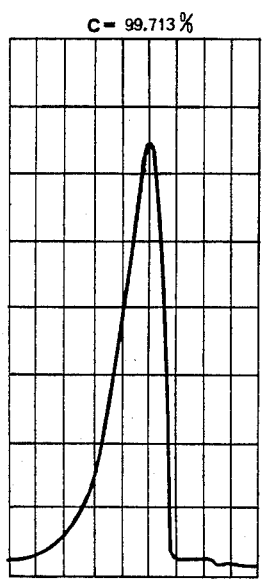

Through gradual warming up of the monomer CR-39, at temperatures in the range of 50°–90° C., under active stirring, to homogenize the fluid and accelerate the elimination of allyl carbonate, the latter was partially eliminated according to the ratio time—temperature—quantity treated, (as in example No. 1). Thus for instance:

Quantity of the treated monomer CR-39: 1 Liter;
Average thermic value: 70° C. during 4 hours+the warming up time and the time of the gradual cooling down to room temperature;
Strength of the monomer, before treatment: 99,158. (FIG. 1).
Strength of the monomer after treatment: 99.713. (FIG. 3).

EXAMPLE NO. 3

Figure 4:
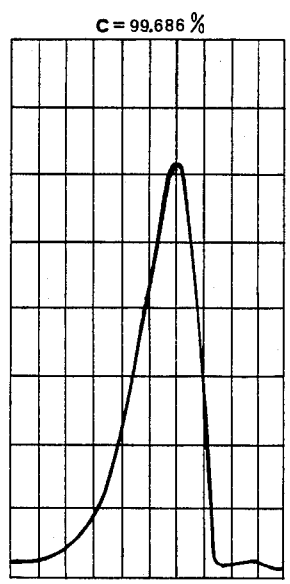

Through warming up of the monomer CR-39, according to the conditions described in the Example N. 1, but carrying out the operations under vacuum, we obtained:

Quantity of the treated monomer CR-39: 1 liter;
Average thermic value: 70° C. during 4 hours+the warming up time and the time of the gradual cooling down to room temperature;
Strength of the monomer before treatment: 99,158 (FIG. 1).
Strength of the monomer after treatment: 99,686. (FIG. 4).

EXAMPLE NO. 4

Figure 5:
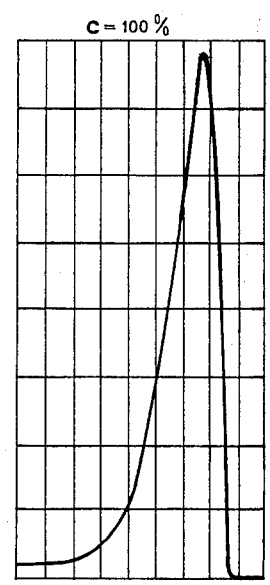

Through warming up of the monomer CR-39, according to the conditions described in the Example No. 2, but carrying out the operation under vacuum, we obtained;

Quantity of the treated monomer CR-39: 1 liter;
Average thermic value: 70° C. during 4 hours+the warming up time and the time of the gradual cooling down to room temperature;
Strength of the monomer, before treatment: 99,158. (FIG. 1).
Strength of the monomer after treatment: 100%. (FIG. 5).

EXAMPLE NO. 5

Through warming up of the monomer according to the conditions described in the Examples No. 1, 2, 3 and 4 the total dehydration of the monomer, was also obtained. Spectrophotometric analysis, in the visible field from 400 to 700 nm, give for the thus depurated monomer CR-39, outstanding linearity and transmission.

STARTER: As a generally accepted rule the isopropyl-dicarbonate-peroxide, known under the commercial name of I.P.P., is added to monomer CR-39, in a percentage of 3%. This percentage has been adopted in all processes, though a higher or a lower percentage may be adopted, for special purpose.

Even if the I.P.P. of the commerce, may be considered as pure, being an industry product difficult to be synthetized and handled, it contains in practice spurs of water and free chlorine ions.

The above may be observed from the infrared spectrophotometric analysis (FIG. 6). To start a series of tests aiming at ascertaining the influence of the chlorine ions on the polymerization, in the frame of the present invention, the isopropyl-dicarbonate-peroxide was synthetized through reaction between sodium peroxide and isopropyl-chloroformiate, (previously purified up to 99,99%). The product obtained was used, after 1, 2, 3, 4, 5 water leachings. Each leaching produced an appreciable reduction of the chlorine ions. By polymerizing the monomer CR-39, with the addition of 3% of isopropyl-dicarbonate-peroxide (obtained from the above mentioned repetitive leachings), according to a gradual thermic cycle of 15 hours, from +40° C. to +110° C., we obtained:

after 1 leaching only: a frankly yellow polymer;
after 2 leachings: a yellow polymer;
after 3 leachings: a pale yellow polymer;
after 4 leachings: a straw-yellow polymer;
after 5 leachings: a colourless polymer.

It was thus ascertained that the yellowing of the polymer depends upon an higher content of chlorine ions.

On the other hand, when leaching with water the isopropyl-dicarbonate-peroxide, we separated a lighter fraction of the same product partially degraded, due to deoxygenation.

To obtain an isopropyl-dicarbonate-peroxide, with the highest grade of purity from free chlorine ions, and degraded deoxygenated fractions, we followed the following line of operations.

EXAMPLE NO. 6

In a bain-marie, cooled to +9° C. we melted 100 gr, of commercial I.P.P. having a point of fusion of +8° C. We added $H_2O$ cooled to +9° C., into which some drops of pyridin had been solved. After stirring and decanting, the phases were separated.

We then washed twice, with $H_2O$, the isopropyl-dicarbonate-peroxide and carefully separated, together with the water, the lighter fraction of the isopropyl-dicarbonate-peroxide, corresponding to the partially degraded or deoxygenated product. At this point a purified I.P.P. had been obtained. (FIG. 7).

EXAMPLE NO. 7

When the I.P.P., purified according to the above described method (Example No. 6), was frozen again and afterwards brought to melting, we observed a melting point of +9° C. (instead +8° C. of the starting material).

EXAMPLE NO. 8

Two test samples prepared with the same CR-39 monomer, catalyzed under the same polymerization conditions, respectively with the addition of 3% of
Commercial I.P.P.; and
I.P.P. depurated according to the method described in Example No. 6 above;
showed following differences, at 53° C., after 4 hours of gradual induced warming up from 40°:
in the test sample added with commercial I.P.P. the monomer was present in the polymer in a percentage of 52%; and
in the test sample added with I.P.P., depurated according to the described method, the monomer was present in the polymer, in a percentage of 34%.

In other words, the use of depurated I.P.P. (when compared with that of commercial I.P.P.) causes a higher catalytic activity, likely to allow to obtain a given polymeric value, with:
reduced percentages of the starter,
shorter times of reaction, and
lower temperatures.

Furthermore the test sample, obtained from purified I.P.P., was perfectly colourless.

ADDITIVES: The addition to the monomers of additives which absorb U.V. radiation, allow the protection of polymers from the degradation caused by said radiation and the like may be added.

As the U.V. absorbers are not easily soluble, the following drawbacks may be observed in the polymer according to the quality and quantity of the absorber used:

optical distortion (diffraction and dispersion), due to unsatisfactory distribution of the absorbers, within the monomer;
yellow, green yellow, orange yellow colour of the product;
transmission interference in the visible electromagnetic field.

With reference to the present invention we selected as the U.V. absorber the 2-(2-hydroxy-5-methyl-phenyl)benzotriazole. To establish the optimal quantity of said U.V. absorber, to be added to the monomer CR-39, with respect to the interferences likely to be caused in the polymer by said addition, so far as the transmission of the visible light is concerned, and the solution methods. The Operations were carried out as follows:

EXAMPLE NO. 9

We obtained a highly satisfactory solution and distribution of 2 (2 hydroxy-5-methyl-phenyl)benzotriazole, in the percentage of 0,0125% in the purified monomer CR-39, (or catalyzed with I.P.P.) by inducing to the container, ultrasonic frequencies in the range of 20-70 KHertz. The selected percentage of 0,0125% of 2.(2.hydroxy-5-methyl-phenyl)benzotriazole caused in the polymer CR-39, on test samples of 4 mm of thickness, a good U.V. absorption and an almost linear transmission in the visible field. (FIG. 8).

EXAMPLE NO. 10

With the use of ultrasounds we obtained the perfect solution and distribution of 2(2-hydroxy- -5-methyl-phenyl)benzotriazole in the monomer CR-39, both pure or catalyzed with I.P.P., in the selected percentage of 0,0100%. The latter percentage of additive originated in the polymer spectra close to what has been described in Example No. 9, on test samples of 6 mm of thickness.

EXAMPLE NO. 11

With the use of ultrasounds, it was possible to obtain the perfect solution and distribution of 2(2-hydroxy-5-methyl-phenyl)benzotriazole, in the monomer CR-39, both pure or catalyzed with I.P.P., in the selected percentage of 0,0150%. The spectra thus originated in the polymer were close to those described in Example No. 9, on test samples of 2 mm of thickness.

EXAMPLE NO. 12

With the use of ultrasounds it was possible to obtain the perfect solution and distribution of a very high percentage of 2(2-hydroxy-5-methyl-phenyl)benzotriazole, with respect to those described in the Examples No. 9,10 and 11 above, both in the pure monomer or catalyzed with I.P.P. or with benzoyl-peroxide. It was thus possible to obtain the preparation of easily tested concentrates, which later on were diluted in the desired percentage, in large quantities of pure or catalyzed monomer.

EXAMPLE NO. 13

CATALYSIS: Under mechanical stirring we mixed:
CR-39 monomer, depurated and dehydrated as indicated in Examples No. 1, 2, 3 and 4 above, with
3% of I.P.P. depurated as in Example No. 6 above, and
0.0125% of 2(2-hydroxy-5-methyl-phenyl)benzotriazole, as in Examples No. 9 and 12 above, the whole being filtered, under decompression.

EXAMPLE NO. 14

Through ultrasonic induction we mixed:
CR-39 monomer, purified and dehydrated as indicated in Examples No. 1, 2, 3 and 4 above, with
3% of I.P.P. depurated as in Example No. 6 above, and
0,0125 of 2(2-hydroxy-5-methyl-phenyl)benzotriazole, as in Examples No. 9 and 12 above,
the whole being filtered under decompression.

EXAMPLE NO. 15

With CR-39 monomer, catalyzed and with the addition of an additive, as indicated in the Examples No. 13 and 14 above, and submitted to a thermal cycle of polymerization, we obtained practically colorless transparent polymers. The latter, if compared with polymers obtained through a current preparation showed a quicker and more uniform polymerization cycle, with reference to the reactive saturation within a time X, for thermal cycles Y and thickness Z. Furthermore, said polymers showed outstanding pysicochemical characteristics, as observed through thermic differential calorimetric analysis, and tests of chemical inertia.

It may be observed that the methods described in the examples above are an improvement or a variant of the techniques already followed up to now, whereas the proportions of the components correspond to values which may be modified, even though following the same techniques.

It may be noted at this point that the disclosure herein of specific working examples and/or embodiments are intended to illustrate the invention, it being understood that same are not intended to limit the invention thereof.

PRINCIPLE OF CONTINUOUS MOLDS COMPENSATION: The shrinkage of CR-39 polymer and its copolymers, causes—as a rule—the need of introducing devices, of an empirical nature to eliminate all possible drawbacks. Generally the polymerization has been carried out with variable thermal cycles, according to the thickness of the polymer. Other devices refer to the ways of assembling the molds and/or to intermediate manipulations. As a rule, with the increase in the thickness of the polymer the duration of the thermal cycles was extended, even to the outmost; the molds filled with the catalyzed monomer were kept at a low temperature (about +40° C.) for a long span of time, to slow down the reaction's speed and to reduce, so far as possible, the negative effects of the shrinkage of the polymers.

Within the frame of the present invention we found a satisfactory solution to the problem through a continuous molds compensation, wherein the catalyzed monomer is likely to fill the cavities, formed during the polymerization, due to the shrinkage of the polymer. The above is possible as the CR-39 monomer, and its copolymers, with addition of peroxide or percarbonate as catalyzer, polymerize only partially and, in any case very slowly, in the presence of air, and remain in a fluid state for a long span of time.

We assembled as follows, molds for the casting of optical lenses.

EXAMPLE NO. 16

Figure 9:
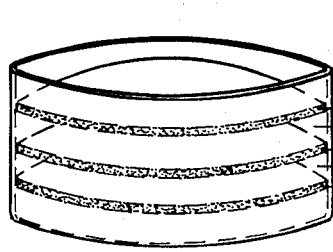

Two or more glass lenses were introduced and brought to slide down within a tubular sleeve of polyethylene (or of a different material, which would not react with the catalyzed monomer). The diameter of the sleeve was kept within such dimensions as to originate sliding elasticity or friction, and to allow the positioning of the lenses at the desired distance from each other. Thus, one or more cavities were created by the lenses' curvature. (FIG. 9 wherein 1=tubular sleeve; 2=lenses; 3=cavity).

EXAMPLE NO. 17

Figure 10:
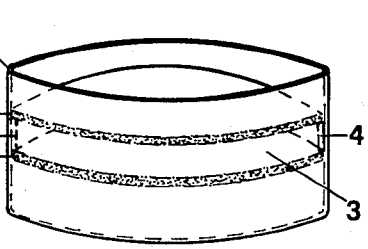

Two or more glass lenses were introduced and brought to slide down within a tubular sleeve as in the Example 16 above, of such a diameter as to originate sliding elasticity or friction. Beforehand, we had introduced a spacer in the tubular sleeve, being of desired length and thickness, to cause the interruption of the sliding of the lenses. (FIG. 10 wherein: 1=tubular sleeve; 2=lenses; 3=cavity; 4=spacer).

EXAMPLE NO. 18

Two or more glass lenses were slid into a tubular sleeve, as in Example No. 16 above, the diameter of the sleeve being about the same as that of the lenses. A spacer had been introduced or cast beforehand in the tube, as in Example No. 17 above.

EXAMPLE NO. 19

Figure 11:
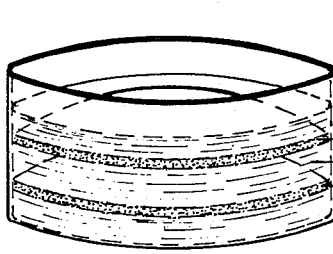
Figures 12, 14:
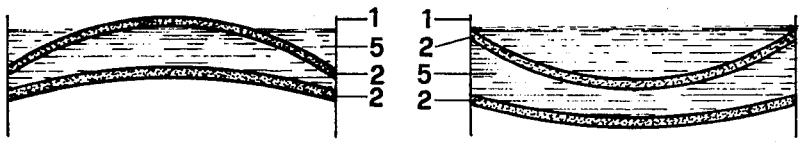
Figure 15:
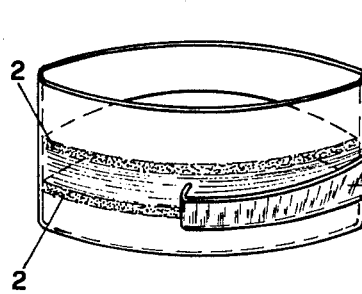

The molds prepared according to Examples No. 16, 17 and 18 above, were filled with CR-39 monomer, catalyzed according to Examples No. 13 and 14 above, and positioned with their convex side upwards. The catalyzed monomer was added in the perimetrical channel, partially formed from the surface of the higher situated lens, and partially from the internal wall of the tube. (FIG. 11 and FIG. 12, wherein: 1=sleeve; 2=lenses; 5=catalyzed monomer).

EXAMPLE NO. 20

Figure 13:
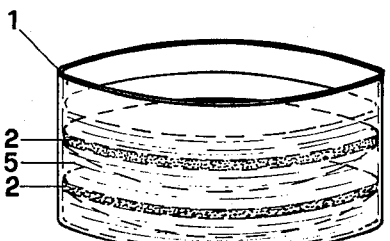

The molds prepared according to Examples No. 16, 17 and 18 above, were filled with CR-39 monomer, catalyzed according to Examples No. 13 and 14 above, and positioned with their concave side upwards. Catalyzed monomer was added in the internal cavity of the higher situated lens, up to reach the internal wall of the tube. (FIG. 13 and FIG. 14, wherein: 1=sleeve; 2=lenses; 5=catalyzed monomer).

EXAMPLE NO. 21

Figure 16:
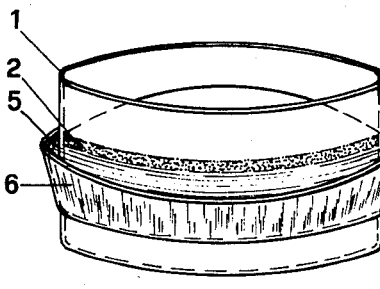

The molds prepared according to Examples No. 16, 17 and 18 above, were filled with CR-39 monomer, catalyzed according to Examples No. 13 and 14 above, and positioned horizontally, according to Examples No. 19 and 20 above. The tubular sleeve was provided with a receptacle communicating with the internal cavity of the mold. The receptacle was also filled with the catalyzed monomer. Said receptacle had been made by totally or partially covering the perimeter of the sleeve. (FIG. 16, wherein: 1=sleeve; 2=lenses; 5=catalyzed monomer; 6=receptacle).

EXAMPLE NO. 22

Figure 17:
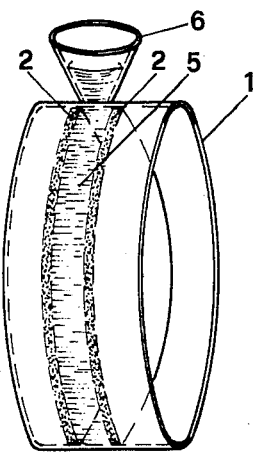

The molds prepared according to Examples No. 16, 17 and 18 above, were filled with CR-39 monomer, catalyzed according to Examples No. 13 and 14 above, and positioned vertically. The external tubular sleeve was provided with a receptacle communicating with the internal cavity of the molds. Said receptacle was also filled with the catalyzed monomer. (FIG. 17, wherein: 1=tubular sleeve; 2=lenses; 5=catalyzed monomer; 6=receptacle).

EXAMPLE NO. 23

Figure 18:
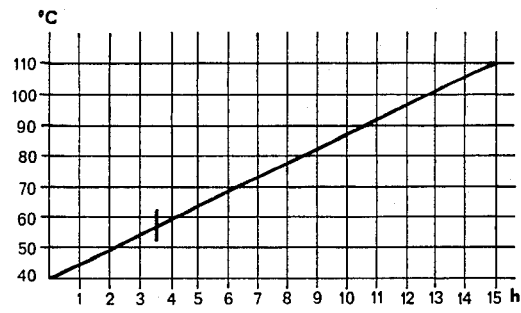

All the molds prepared and positioned as indicated in the Examples above, the cavities of which corresponded to the shape of every type of lens (vertical, convergent, divergent, cylindrical, lenticular, bifocal; prismatic, etc.) were submitted, in an oven, to the same thermic cycle of 15 hours. (FIG. 18). The vertical stroke appearing in the cycle, indicates, as it will be further explained, the moment where the springs were applied to the molds, i.e. when the gel phase of the monomer had been completed. The perfectly polymerized lenses thus obtained, showed finished surfaces and various curves and thicknesses. Their diameter was practically equal to that of the glass lenses forming the simple or multiple molds (with a very low reduction equal, as an average to 0,7%).

It was thus experimentally confirmed how the continuous compensation had operated, according to the ways and means described in the Examples above, establishing a continuous flow of polymerizable monomer from the outside into the inside of the molds, compensating for shrinkages, and hindering suction and/or the creation of air bubbles, which would have caused the separation of the polymer from the mold.

The flow from the exterior to the interior had been made possible by means of preformed passages or through a capillarity. The polymers thus obtained had a particularly homogeneous aspect.

SELF-POSITIONING SPRING: Many CR-39 lenses, available on the market, when examined with polarized light, show tensions which cannot be removed, even submitting the polymers to heat-treatment. In the frame of the present invention we considered the convenience of applying pressure on the lenses forming the mold, after the polymer had reached the gel phase. It was then decided to use a spring, designed to press on every kind of curved or plain surface, and to position itself through homogeneous contact on the whole of the support surface, to avoid localized high pressure, likely to cause the breaking of the molds or of the polymers, or unacceptable pressures on the polymers themselves.

EXAMPLE NO. 24

Figure 19:
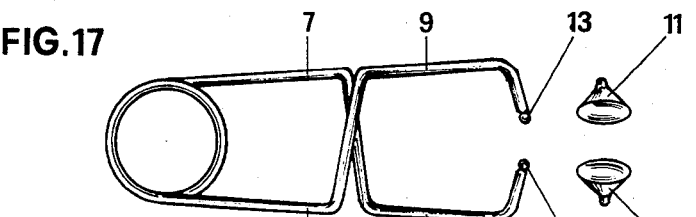
Figure 20:
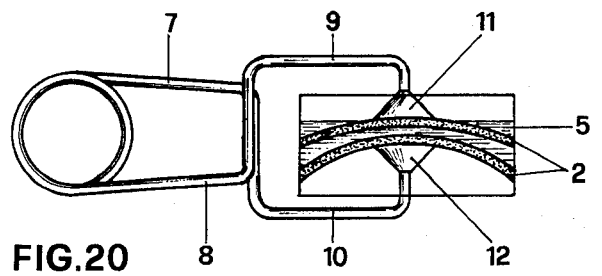

We built springs that easily press on the molds, by means of the compression of spring arms 7, 8 causing the elastic tensioning of the pressers 9, 10. The latter having small saucers 11, 12 shaped as a meniscus on their ends which may swivel in all directions around pins or balls 13, 14. Said springs adapt to various mold assemblies, including curves or various planes, and by means of the swinging of the small saucers, allow a perfect adherence, likely to exert an even pressure, very useful to the production of regular polymers. (FIG. 19 and FIG. 20).

EXAMPLE NO. 25

Figure 21:
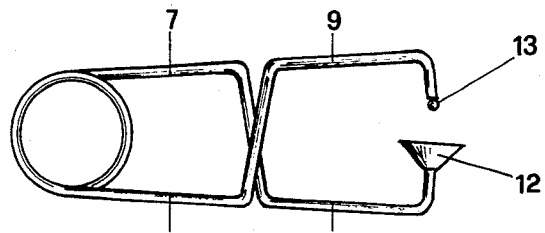

Springs as in Example No. 24 above, but provided with only one small saucer are shown in FIG. 21.

OPENING OF THE MOLDS: The lens made of CR-39 and its copolymers, is strongly adherent to the casting mold, thus the separation from each other is a problem difficult to solve, particularly in the frame of the present invention. In fact, as the diameter of the polymer obtained, is practically equal to the molds, it is impossible to achieve a mechanical separation by means of a wedge or a similar tool. In the frame of the present invention it was discovered that ultrasounds in the range of 20-70 KHertz, induced in a tank filled with water, in which the molds had been immersed, after the polymerization of their content, caused the separation of the polymers from the molds.

EXAMPLE NO. 26

To separate the polymer from the glass lenses, forming the molds, the latter were immersed in warm water baths, after which ultrasonic frequencies in the range of 20-70 KHertz were induced.

In all cases, after some minutes, the polymer separated from the molds. The duration of the operation depended upon the bath temperature: it was shorter for an higher temperature and vice versa.

EXAMPLE NO. 27

To carry out at the same time the separation of the polymer obtained from the glass lenses constituting the molds, and a first washing up of the latter, the molds were immersed in warm baths of water solution of any type of cleansing substance (such as detergent, detersive, degreasing, emulsifying or saponification agent, solvent, acid or Alkaline substance). In every case, within some minutes from the induction to the bath of ultrasonic frequencies, in the range of 20-70 KHertz, the polymer separated from the molds: the relation: duration of the operation/bath temperature was the same as indicated in the Example No. 26.

From the above it appears evident that the described process and/or the means object of the present invention, which allow the production of quality lenses or other optical devices, made of CR-39 and its copolymers, may be directly or indirectly related to the whole field of applications of cast homopolymers and copolymers with reference to the casting of whichever product, and the applicability or the selection of a whichever polymerizable resin. It also clearly appears that the examples—though referring to specific realizations of the present invention, cannot be considered as limiting the latter.

What is claimed is:

1. A process of continuous compensation casting a lens of a resinous thermohardening plastics material, said process comprising the steps of:

(1) forming a tubular sleeve of a substantially nondeformable plastic material which is chemically compatible with the thermohardening plastics resin and which sleeve is thermally stable at polymerization temperatures;

(2) positioning two mold halves within said sleeve at a predetermined distance apart from each other defining, together with the adjacent internal lateral wall of the sleeve between the two mold halves, a cavity with a diameter the same as each of the mold halves, each mold half retained in position within the sleeve by friction between the mold half rim and the adjacent sleeve wall with which it is in contact;

(3) providing a compensation reservoir external of the cavity and in fluid communication therewith through at least one preformed passageway therebetween;

(4) introducing a flowable, catalyst-containing thermohardening, homogeneously-polymerizing monomer into the cavity via the preformed passageway and completely filling the cavity, the compensation reservoir and the preformed passageway therebetween;

(5) heating the thus formed and filled mold assembly for a period of time to initiate polymerization of the thermohardening monomer, wherein initially the monomer so heated expands and flows from the cavity to the compensation reservoir, then later during the polymerization the polymerizing monomer contracts and flows from the compensation reservoir into the cavity as required to compensate for monomer shrinkage within the mold, until the gel stage is reached, the heating being continued until the gel stage of polymerization is reached and flow between the compensation reservoir and the cavity stops;

(6) continuing the heating of the mold assembly until the monomer is completely polymerized, while concurrently moving the mold halves towards each other as required to compensate for the continuing shrinkage of the polymerizing monomer, the shrinkage of the monomer under polymerization from the gel stage to final polymerization being solely compensated by moving the mold halves towards each other; and thereafter (7) removing the two mold halves from the so produced lens when polymerization of the monomer is completed.

2. The process in accordance with claim 1 wherein said monomer is diethyleneglycol-bis-allyl-carbonate.

3. The process in accordance with claim 1 wherein said monomer is diethyleneglycol-bis-allyl-carbonate and copolymers thereof.

4. The process in accordance with claim 1, 2 or 3 wherein the monomer is diethylene-glycol-bis-allyl-carbonate catalyzed with isopropyl dicarbonate-peroxide.

5. The process in accordance with claim 1, 2 or 3 wherein said monomer is catalyzed with isopropyl dicarbonateperoxide and also contains 2-(2-hydroxy-5-methyl-phenyl)benzotriazole as an U.V. absorber.

6. The process in accordance with claim 1 wherein the catalyzed monomer is heated during the total of steps (5) and (6) for a period of 15 hours during which time the temperature gradually increases from about +40° C. to about 110° C.

7. The process in accordance with claim 1 wherein the compensation reservoir is integral with a portion of the tubular sleeve.

8. The process in accordance with claim 1 wherein the compensation reservoir is placed adjacent to the exterior of the tubular sleeve in a position corresponding to the cavity as defined by the two mold halves.

9. The process in accordance with claim 1 wherein the compensation reservoir is contained within the tubular sleeve above the upper mold half.

10. The process in accordance with claim 1 wherein after the gel stage of the monomer has been reached in step (5), compression springs are applied to the two mold halves prior to step (6) and remain in place during the heating of step (6).

11. The process in accordance with claim 1 or 10, wherein the compression springs applied to the mold include at least one meniscus-shaped contact saucer around an articulation pin.

12. The process in accordance with claim 1 wherein the lens is removed from the mold halves in step (7) by immersing in a warm water bath and subjecting the assembly to ultrasonic frequencies between 20 and 70 KHz.

13. The process in accordance with claim 12, wherein the water bath is an aqueous solution of a surfactant.

* * * * *